United States Patent
Zhang et al.

(10) Patent No.: US 11,681,018 B2
(45) Date of Patent: Jun. 20, 2023

(54) HIGH-SPEED LASER DISTANCE MEASURING DEVICE

(71) Applicant: HANGZHOU OLE-SYSTEMS CO., LTD., Zhejiang (CN)

(72) Inventors: Ou Zhang, Zhejiang (CN); Yaping Zhu, Zhejiang (CN)

(73) Assignee: HANGZHOU OLE-SYSTEMS CO., LTD., Zhejiang (CN)

( * ) Notice: Subject to any disclaimer, the term of this patent is extended or adjusted under 35 U.S.C. 154(b) by 469 days.

(21) Appl. No.: 16/639,149

(22) PCT Filed: Aug. 15, 2017

(86) PCT No.: PCT/CN2017/097545
§ 371 (c)(1),
(2) Date: Feb. 14, 2020

(87) PCT Pub. No.: WO2019/033279
PCT Pub. Date: Feb. 21, 2019

(65) Prior Publication Data
US 2020/0233063 A1    Jul. 23, 2020

(30) Foreign Application Priority Data

Aug. 14, 2017 (CN) .......................... 201710693375.4

(51) Int. Cl.
*G01S 7/48* (2006.01)
*G01S 7/499* (2006.01)
(52) U.S. Cl.
CPC ............ *G01S 7/4808* (2013.01); *G01S 7/499* (2013.01)
(58) Field of Classification Search
None
See application file for complete search history.

(56) References Cited

U.S. PATENT DOCUMENTS 9,097,511 B2    8/2015 Kuroda
9,116,243 B1    8/2015 Brown
(Continued)

FOREIGN PATENT DOCUMENTS

CN    103308926 A  *  9/2013
CN    103308926 A     9/2013
(Continued)

OTHER PUBLICATIONS

"Cheng Z, Laser radar set with high spectral resolution, 2013" (Year: 2013).*

(Continued)

*Primary Examiner* — James M McPherson
*Assistant Examiner* — Bakari Underwood
(74) *Attorney, Agent, or Firm* — Dentons US LLP

(57) ABSTRACT

A high-speed laser distance measuring device is described that includes an emitting part and a receiving part. The emitting part can include a polarizer (2) arranged between a light emitting tube (1) and a reflective mirror (3); the receiving part can further include a polarizing beamsplitter (7) arranged between the optical filter (6) and the receiving tube set. The light emitting tube (1) can emit an outgoing light beam to the polarizer (2), and the outgoing light beam can form an outgoing polarized light beam and is transmitted into the reflective mirror (3). After being reflected by the reflective mirror (3) and passing through the transmitting objective lens (4), the outgoing polarized light beam can be transmitted onto a target object. After being reflected by the target object, the outgoing polarized light beam can form a reflected polarized light beam, which passes through the receiving objective lens set (5) and is transmitted to the optical filter (6). After being filtered, the reflected polarized light beam is transmitted into the polarizing beamsplitter (7), and is split into a first reflected polarized light beam and a (Continued)

second reflected polarized light beam, which are transmitted into the first receiving tube (8), and the second receiving tube (9) respectively. The high-speed laser distance measuring device can identify the light formed by the reflection of an oriented reflective target and a target object, and can adopt different receiving means for receiving them. Simultaneously, it can effectively filter the interference caused by particulate matter in the test environment to the test.

7 Claims, 1 Drawing Sheet

(56) References Cited

U.S. PATENT DOCUMENTS

2014/0146303 A1    5/2014    Mitchell et al.
2018/0120424 A1*   5/2018    Eshel .................... G01S 7/4814

FOREIGN PATENT DOCUMENTS

| CN | 106443710 A | 2/2017 |
| CN | 106705858 A | 5/2017 |
| CN | 207096452 U | 3/2018 |
| JP | 8-136455 A | 5/1996 |
| JP | 2009-8404 A | 1/2009 |

OTHER PUBLICATIONS

Extended Search Report dated Feb. 24, 2021 in corresponding European Patent Application No. 17921767.4, 12 pages.
Office Action dated Mar. 3, 2021 in corresponding Japanese Patent Application No. 2020-508353, 1 page.
International Search Report and Written Opinion dated Apr. 28, 2018 in corresponding International Patent Application No. PCT/CN2017/097545, filed Aug. 15, 2017, 11 pages.

* cited by examiner

HIGH-SPEED LASER DISTANCE MEASURING DEVICE

CROSS-REFERENCE TO PRIOR APPLICATIONS

This application is a National Stage of PCT/CN2017/097545, filed Aug. 15, 2017, and designating the United States of America (published on Feb. 21, 2019, as WO 2019/033279 A1), which claims priority under 35 U.S.C. § 119 to Chinese Patent Application No. 201710693375.4, filed Aug. 14, 2017, each hereby expressly incorporated by reference in its entirety and each assigned to the assignee hereof.

TECHNICAL FIELD

The present invention relates to the field of distance measurement, and in particular to a high-speed laser distance measuring device.

BACKGROUND

Currently, during the use of lidar, it is common that an oriented reflective target (a reflecting prism) is arranged on a target object to be measured, such that a lidar device can easily implement identification to fix a position. However, owing to that the intensity of the light reflected by the reflective target (the reflecting prism) is too high, using one photoelectric device for receiving the lights reflected by the reflective target (the reflecting prism) and the target object to be measured, would cause irreversible damage to the receiver of the lidar device, and in the long term, result in a decrease in measurement accuracy.

On the other hand, based on the lidar test technology in the prior art, it is impossible to precisely identify particulate matters such as tiny dust and water mist existing in the measurement environment which causes a certain degree of interference to the measurement results. For instance, in an experiment, if water mist is sprayed around the lidar device, an image derived after scanning appears to be of a shape around with water mist, thereby leading to that the lidar device cannot measure the indoor contour precisely.

Hence, it is necessary to provide a novel high-speed laser distance measuring device, which is able to distinguish between lights reflected by an oriented reflective target and a target object, and receives them respectively by means of different photoelectric induction devices. The device can not only avoid the irreversible damage to the receiver thereof, but also effectively filter the interference caused by various particulates in the environment to the test results.

SUMMARY

For overcoming the aforementioned technical problems, the objective of the present invention is to provide a high-speed laser distance measuring device.

The high-speed laser distance measuring device provided by the present invention adopts a polarizer and a polarizing beamsplitter for implementing the identification of the high-speed laser distance measuring device on the reflected light formed by an oriented reflective target and a target object and employs receiving means with different sensitivities for receiving the light, which can not only avoid the irreversible damage to the receiver thereof, but also effectively filter the interference caused by various particulates in the environment to the test results The present invention provides a high-speed laser distance measuring device, comprising an emitting part and a receiving part;

the emitting part includes a light emitting tube, a reflective mirror, and a transmitting objective lens;

the receiving part includes a receiving objective lens set, an optical filter and a receiving tube set;

the emitting part further includes a polarizer arranged between the light emitting tube and the reflective mirror;

the receiving part further includes a polarizing beamsplitter arranged between the optical filter and the receiving tube set, wherein the receiving tube set includes a first receiving tube and a second receiving tube;

the light emitting tube emits an outgoing light beam to the polarizer, and after passing through the polarizer, the outgoing light beam forms an outgoing polarized light beam; the outgoing polarized light beam is transmitted into the reflective mirror, and after being reflected by the reflective mirror and passing through the transmitting objective lens, is transmitted onto a target object;

after being reflected by the target object, the outgoing polarized light beam forms a reflected polarized light beam, which passes through the receiving objective lens set and is transmitted to the optical filter; after being filtered by the optical filter, the reflected polarized light beam is transmitted into the polarizing beamsplitter, and is split by the polarizing beamsplitter into a first reflected polarized light beam and a second reflected polarized light beam, wherein the first reflected polarized light beam passes through the polarizing beamsplitter and is transmitted into the first receiving tube; and the second reflected polarized light beam is reflected by the polarizing beamsplitter and transmitted into the second receiving tube.

Preferably, the outgoing direction of the first reflected polarized light beam is a first light outgoing direction; the outgoing direction of the second reflected polarized light beam is a second light outgoing direction; and the first light outgoing direction and the second light outgoing direction are orthogonal.

Preferably, the reflected polarized light beam includes p-polarized light and s-polarized light; when the first reflected polarized light beam is the p-polarized light, the second reflected polarized light beam is the s-polarized light; and when the first reflected polarized light beam is the s-polarized light, the second reflected polarized light beam is the p-polarized light.

Preferably, when the target object is provided with an oriented reflective target and the test environment between the high-speed laser distance measuring device and the target object contains with particulate matters, the p-polarized light is formed by the reflection of the outgoing polarized light beam from the oriented reflective target, particulate matters and the target object; the s-polarized light is formed by the reflection of the outgoing polarized light beam from the target object.

Preferably, the polarized light beam reflected by the oriented reflective target forms a first p-polarized light, the polarized light beam reflected by the particulate matters forms a second p-polarized light, and the polarized light beam reflected by the target object forms a third p-polarized light.

Preferably, the order of magnitude of the intensity of the first p-polarized light is larger than that of the second p-polarized light and the third p-polarized light; and the first receiving tube or the second receiving tube identifies the photoelectric signal of the first p-polarized light according to the order of magnitude of the intensity thereof.

Preferably, after receiving the p-polarized light and the s-polarized light respectively, the first receiving tube and the second receiving tube identifies the photoelectric signals of the first p-polarized light and the s-polarized light, and the high-speed laser distance measuring device calculates the relative position to the target object according to the photoelectric signals.

Comparing with the prior art, the technical advantages of the present invention lie in that:

1. it is of a simple structure;
2. it is able to identify the light formed by the reflection of an oriented reflective target and a target object, and adopts different receiving means for receiving them;
3. it is able to effectively filter the interference caused by particulate matters in the test environment to the test;
4. it is of high measurement accuracy.

REFERENCE NUMERALS

1—light emitting tube
2—polarizer
3—reflective mirror
4—transmitting objective lens
5—receiving objective lens set
6—optical filter
7—polarizing beamsplitter
8—first receiving tube
9—second receiving tube

DETAILED DESCRIPTION

The present invention provides a high-speed laser distance measuring device, comprising an emitting part and a receiving part;

the emitting part includes a light emitting tube, a reflective mirror, and a transmitting objective lens;

the receiving part includes a receiving objective lens set, an optical filter and a receiving tube set;

the emitting part further includes a arranged between the light emitting tube and the reflective mirror;

the receiving part further includes a polarizing beamsplitter arranged between the optical filter and the receiving tube set, wherein the receiving tube set includes a first receiving tube and a second receiving tube;

the light emitting tube emits an outgoing light beam to the polarizer, and after passing through the polarizer, the outgoing light beam forms an outgoing polarized light beam; the outgoing polarized light beam is transmitted into the reflective mirror, and after being reflected by the reflective mirror and passing through the transmitting objective lens, is transmitted onto a target object;

after being reflected by the target object, the outgoing polarized light beam forms a reflected polarized light beam, which passes through the receiving objective lens set and is transmitted to the optical filter; after being filtered by the optical filter, the reflected polarized light beam is transmitted into the polarizing beamsplitter, and is split by the polarizing beamsplitter into a first reflected polarized light beam and a second reflected polarized light beam, wherein the first reflected polarized light beam passes through the polarizing beamsplitter and is transmitted into the first receiving tube; and the second reflected polarized light beam is reflected by the polarizing beamsplitter and transmitted into the second receiving tube.

Hereinafter the advantages of the present invention will be further described in conjunction with the accompanying drawings and specific embodiments.

Embodiment 1

Figure 1:
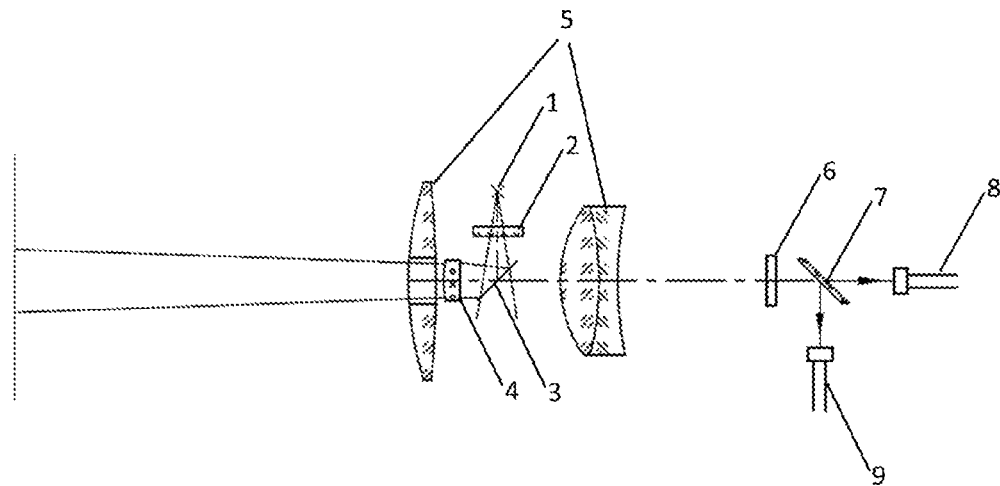
FIG. 1 is a schematic structural view of a high-speed laser distance measuring device according to an embodiment of the present invention.

As shown in FIG. 1, it is a schematic structural view of a high-speed laser distance measuring device in an embodiment of the present invention, which includes an emitting part and a receiving part. The emitting part includes a light emitting tube 1, a polarizer 2, a reflective mirror 3, and a transmitting objective lens 4. The receiving part includes a receiving objective lens set 5, an optical filter 6, a polarizing beamsplitter 7, a first receiving tube 8 and a second receiving tube 9.

As shown in FIG. 1, the polarizer 2 faces toward the light emitting tube 1, and is provided under the light emitting tube 1 in the perpendicular direction. The reflective mirror 3 faces toward the polarizer 2, and is provided under the polarizer 2 in the perpendicular direction. The polarizing beamsplitter 7 is provided among the optical filter 6, the first receiving tube 8 and the second receiving tube 9. The first receiving tube 8 is provided in the horizontal direction of the polarizing beamsplitter 7; the second receiving tube 9 is provided in the perpendicular direction of the polarizing beamsplitter 7.

The light emitting tube 1 emits an outgoing light beam downward to the polarizer 2, and after passing through the polarizer 2, the outgoing light beam forms an outgoing polarized light beam; the outgoing polarized light beam is transmitted into the reflective mirror 3, and after being reflected by the reflective mirror 3 and passing through the transmitting objective lens 4, is transmitted onto a target object. The outgoing polarized light beam emitted by the light emitting means of the high-speed laser distance measuring device, after being reflected by the target object, forms a reflected polarized light beam. The reflected polarized light beam passes through the receiving objective lens set 5 and is transmitted to the optical filter 6 which filters out stray light not transmitted from the high-speed laser distance measuring device. After being filtered, the reflected polarized light beam is transmitted into the polarizing beamsplitter 7, and is split by the polarizing beamsplitter 7 into a first reflected polarized light beam and a second reflected polarized light beam. The first reflected polarized light beam passes through the polarizing beamsplitter 7 and is transmitted into the first receiving tube 8 located in the horizontal direction of the polarizing beamsplitter 7; the second reflected polarized light beam is reflected by the polarizing beamsplitter 7 and transmitted into the second receiving tube 9 boated in the perpendicular direction of the polarizing beamsplitter 7. The first receiving tube 8 and the second receiving tube 9 are two photoelectric receiving means, for example, APDs or the like elements. Upon receiving the first reflected polarized light beam and the second reflected polarized light beam, the first receiving tube 8 and the second receiving tube 9 of the high-speed laser distance measuring device calculates the distance to the target object based on the signals of the intensity of the first reflected polarized light beam and the second reflected polarized light beam. Thus, the high-speed laser distance measuring device is able to process two signals with different orders of magnitude separately, and make a corresponding adjustment to the sensitivity of the receiving tube receiving higher energy, so as to avoid irreversible damage.

Embodiment 2

Figure 2:
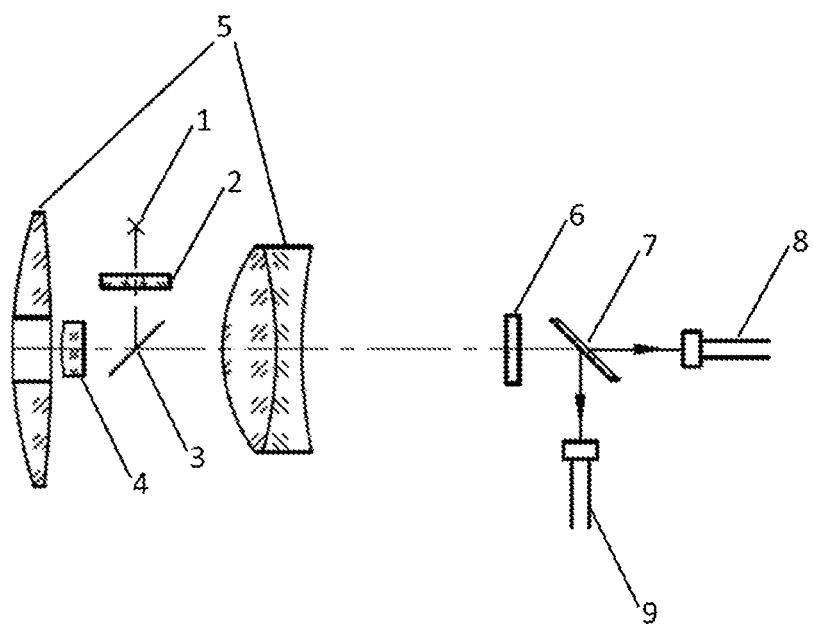
FIG. 2 is a schematic structural view of a high-speed laser distance measuring device according to an embodiment of the present invention.

As shown in FIG. 2, it is a schematic structural view of a high-speed laser distance measuring device according to an embodiment of the present invention. An emitting part of the high-speed laser distance measuring device as shown in FIG. 2 includes a light emitting tube 1, a polarizer 2, a reflective mirror 3, and a transmitting objective lens 4. A receiving part thereof includes a receiving objective lens set 5, an optical filter 6, a polarizing beamsplitter 7, a first receiving tube 8 and a second receiving tube 9.

As shown in FIG. 2, the polarizer 2 faces toward the light emitting tube 1, and is provided under the light emitting tube 1 in the perpendicular direction. The reflective mirror 3 faces toward the polarizer 2, and is provided under the polarizer 2 in the perpendicular direction. The polarizing beamsplitter 7 is provided among the optical filter 6, the first receiving tube 8 and the second receiving tube 9. The first receiving tube 8 is provided in the horizontal direction of the polarizing beamsplitter 7; the second receiving tube 9 is provided in the perpendicular direction of the polarizing beamsplitter 7.

The light emitting tube 1 emits an outgoing light beam downward to the polarizer 2, and after passing through the polarizer 2, the outgoing light beam forms an outgoing polarized light beam; the outgoing polarized light beam is transmitted into the reflective mirror 3, and after being reflected by the reflective mirror 3 and passing through the transmitting objective lens 4, is transmitted onto a target object. The outgoing polarized light beam emitted by the light emitting means of the high-speed laser distance measuring device, after being reflected by the target object, forms a reflected polarized light beam. The reflected polarized light beam passes through the receiving objective lens set 5 and is transmitted to the optical filter 6 which filters out stray light not transmitted from the high-speed laser distance measuring device. After being filtered, the reflected polarized light beam is transmitted into the polarizing beamsplitter 7, and is split by the polarizing beamsplitter 7 into a first reflected polarized light beam and a second reflected polarized light beam.

Preferably, in the embodiment of the present invention, the outgoing direction of the first reflected polarized light beam is defined as a first light outgoing direction, while the outgoing direction of the second reflected polarized light beam is defined as a second light outgoing direction. The reflected polarized light beam is split by the polarizing beamsplitter 7 into a first reflected polarized light beam which is transmitted in the first light outgoing direction and a second reflected polarized light beam which is reflected in the second light outgoing direction. Furthermore, the first light outgoing direction and the second light outgoing direction are orthogonal.

Preferably, the reflected polarized light beam in the embodiment of the present invention could be split by the polarizing beamsplitter 7 into s-polarized light and p-polarized light, that is, the first reflected polarized light beam is p-polarized light, while the second reflected polarized light beam is s-polarized light, or the first reflected polarized light beam is s-polarized light, while the second reflected polarized light beam is p-polarized light. In this embodiment, the first reflected polarized light beam is defined as s-polarized light, while the second reflected polarized light beam is defined as p-polarized light. The s-polarized light passes through the polarizing beamsplitter 7 and is transmitted into the first receiving tube 8 located in the horizontal direction of the polarizing beamsplitter 7; the p-polarized light is reflected by the polarizing beamsplitter 7 and transmitted into the second receiving tube 9 located in the perpendicular direction of the polarizing beam splitter 7. The first receiving tube 8 and the second receiving tube 9 are two photoelectric receiving means, for example, APDs or the like elements. Upon receiving the s-polarized light and the p-polarized light, the first receiving tube 8 and the second receiving tube 9 of the high-speed laser distance measuring device are able to calculate the distance to the target object based on the photoelectric signals of the s-polarized light and the p-polarized light.

Preferably, during the current use of the high-speed laser distance measuring device, an oriented reflective target (a reflecting prism) is provided on the target object, such that the high-speed laser distance measuring device can implement identification to fix a position. Additionally, there are some particulate matters such as tiny dust and water mist existing in the test environment of the high-speed laser distance measuring device. In this case, the outgoing polarized light beam emitted by the high-speed laser distance measuring device, after encountering the reflective target and particulate matters, is reflected and only forms p-polarized light. The outgoing polarized light beam emitted by the high-speed laser distance measuring device, after encountering the target object, is reflected and form both p-polarized light and s-polarized light. That is, in the embodiment of the present invention, the p-polarized light received by the second receiving tube 9 contains three parts: the light reflected from the reflective target, particulate matters and the target object. Meantime, the first receiving tube 8 receives s-polarized light reflected from the target object.

In the embodiment of the present invention, the p-polarized light from the oriented reflective target is defined as a first p-polarized light, the p-polarized light from particulate matters as a second p-polarized light, and the p-polarized light from the target object as a third p-polarized light, wherein the order of magnitude of the intensity of the first p-polarized light is far larger than that of the second p-polarized light and the third p-polarized light. Therefore, owing to that the first p-polarized light from the oriented reflective target has the intensity multiple orders of magnitude larger than that of the second p-polarized light and the third p-polarized light, upon receiving the first p-polarized light, the second p-polarized light and the third p-polarized light reflected by the polarizing beamsplitter, the second receiving tube 9 of the high-speed laser distance measuring device can identify automatically the photoelectric signal of the first p-polarized light from the oriented reflective target, and omit that of the second p-polarized light and the third p-polarized light. Correspondingly, the first receiving tube 8 identifies the photoelectric signal of s-polarized light according to the received s-polarized light from the target object. After finishing the identification of the photoelectric signals, the high-speed laser distance measuring device calculates the distance to the target object according to the photoelectric signals formed by the reflection of the oriented reflective target and the target object and identified by the first receiving tube 8 and the second receiving tube 9.

The high-speed laser distance measuring device provided by the invention is adopted, in which an existing high-speed laser distance measuring device is further provided with a polarizer in the emitting part, and a polarizing beamsplitter in the receiving part. By using the aforementioned arrangement, the light beam emitted by the high-speed laser distance measuring device is converted into an outgoing polarized light beam, and the reflected polarized light beam reflected by the oriented reflective target, particulate matters and the target object is split into p-polarized light and s-polarized light, which is received respectively by the first receiving tube 8 and the second receiving tube 9 with different sensitivities, thus avoiding the irreversible damage to the receiving tubes caused by the p-polarized light with too high light intensity formed by the reflection of the oriented reflective target. Additionally, through splitting the reflected polarized light beam and utilizing the first p-polarized light with high intensity formed by the reflection of the oriented reflective target, the interference to the test of the high-speed laser distance measuring device caused by the second p-polarized light formed by the reflection of the particulate matters is further omitted.

In summary, the high-speed laser distance measuring device provided by the present invention with a simple structure is able to identify the light formed by the reflection of the oriented reflective target and the target object, correspondingly employs receiving means with different sensitivities to receive the light, and simultaneously, filters effectively the interference caused by particulate matters in the test environment to the test, thereby avoiding the damage to the receiving means of the high-speed laser distance measuring device and improving the measurement accuracy thereof to a certain degree.

It should be noted that the embodiments of the present invention are of good operability, but not for constituting any limitation to the protection scope thereof. Any person skilled in the art can make alterations or modifications to the embodiments by the aforementioned technical contents, to form an equivalent and effective embodiment. Any amendments, equivalent changes and modifications to the above-mentioned embodiments based on the technical essence of the present invention, without departing from the technical solutions of the present invention, shall belong to the scope defined by the technical solutions of the present invention.

What is claimed is:

1. A high-speed laser distance measuring device, the high-speed laser distance measuring device comprising an emitting part and a receiving part, wherein:

the emitting part comprises a light emitting tube, a reflective mirror, a transmitting objective lens, and a polarizer between the light emitting tube and the reflective mirror;

the receiving part comprises a receiving objective lens set, an optical filter, a receiving tube set, and a polarizing beamsplitter between the optical filter and the receiving tube set;

the receiving tube set comprises a first receiving tube and a second receiving tube, with the first receiving tube positioned in a horizontal direction of the polarizing beamsplitter and the second receiving tube positioned in a perpendicular direction of the polarizing beamsplitter;

the light emitting tube emits an outgoing light beam to the polarizer, and after passing through the polarizer, the outgoing light beam forms an outgoing polarized light beam; the outgoing polarized light beam is transmitted into the reflective mirror, and after being reflected by the reflective mirror and passing through the transmitting objective lens, is transmitted onto a target object;

after being reflected by the target object, the outgoing polarized light beam forms a reflected polarized light beam, which passes through the receiving objective lens set and is transmitted to the optical filter; after being filtered by the optical filter, the reflected polarized light beam is transmitted into the polarizing beamsplitter, and is split by the polarizing beamsplitter into a first reflected polarized light beam and a second reflected polarized light beam, the first reflected polarized light beam passes through the polarizing beamsplitter and is transmitted into the first receiving tube, and the second reflected polarized light beam is reflected by the polarizing beamsplitter and transmitted into the second receiving tube.

2. The high-speed laser distance measuring device according to claim 1, wherein the outgoing direction of the first reflected polarized light beam is a first light outgoing direction; the outgoing direction of the second reflected polarized light beam is a second light outgoing direction; and the first light outgoing direction and the second light outgoing direction are orthogonal.

3. The high-speed laser distance measuring device according to claim 1, wherein the reflected polarized light beam comprises p-polarized light and s-polarized light; when the first reflected polarized light beam is the p-polarized light, the second reflected polarized light beam is the s-polarized light; and when the first reflected polarized light beam is the s-polarized light, the second reflected polarized light beam is the p-polarized light.

4. The high-speed laser distance measuring device according to claim 3, wherein when the target object is provided with an oriented reflective target and a test environment between the high-speed laser distance measuring device and the target object contains particulate matter, the p-polarized light is formed by the reflection of the outgoing polarized light beam from the oriented reflective target, particulate matter and the target object; the s-polarized light is formed by the reflection of the outgoing polarized light beam from the target object.

5. The high-speed laser distance measuring device according to claim 4, wherein the polarized light beam reflected by the oriented reflective target forms a first p-polarized light, the polarized light beam reflected by the particulate forms a second p-polarized light, and the polarized light beam reflected by the target object forms a third p-polarized light.

6. The high-speed laser distance measuring device according to claim 5, wherein the order of magnitude of the intensity of the first p-polarized light is larger than that of the second p-polarized light and the third p-polarized light; and the first receiving tube or the second receiving tube identifies the photoelectric signal of the first p-polarized light according to the order of magnitude of the intensity thereof.

7. The high-speed laser distance measuring device according to claim 5, wherein after receiving the p-polarized light and the s-polarized light, the first receiving tube and the second receiving tube identify the photoelectric signals of the first p-polarized light and the s-polarized light, and the high-speed laser distance measuring device calculates the relative position to the target object according to the photoelectric signals.

* * * * *